(12) United States Patent
Tomizawa et al.

(10) Patent No.: US 9,481,391 B2
(45) Date of Patent: Nov. 1, 2016

(54) ELECTRIC POWER STEERING APPARATUS

(71) Applicant: Fuji Jukogyo Kabushiki Kaisha, Tokyo (JP)

(72) Inventors: Hidehisa Tomizawa, Tokyo (JP); Toshi Ishida, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/862,246

(22) Filed: Sep. 23, 2015

(65) Prior Publication Data

US 2016/0090119 A1 Mar. 31, 2016

(30) Foreign Application Priority Data

Sep. 26, 2014 (JP) .................................. 2014-196458

(51) Int. Cl.
*B62D 5/04* (2006.01)

(52) U.S. Cl.
CPC ............... *B62D 5/0463* (2013.01); *B62D 5/04* (2013.01); *B62D 5/0466* (2013.01); *B62D 5/0484* (2013.01)

(58) Field of Classification Search
CPC . B62D 5/0463; B62D 5/0466; B62D 5/0421
See application file for complete search history.

(56) References Cited

U.S. PATENT DOCUMENTS

| 2007/0131476 | A1* | 6/2007 | Kubokawa | B62D 1/163 180/444 |
| 2012/0111658 | A1* | 5/2012 | Hori | B62D 5/008 180/446 |
| 2012/0303218 | A1* | 11/2012 | Tamura | B62D 1/02 701/41 |
| 2013/0233638 | A1* | 9/2013 | Lee | B62D 5/04 180/444 |
| 2015/0291208 | A1* | 10/2015 | Miyasaka | B62D 5/003 701/41 |
| 2015/0360715 | A1* | 12/2015 | Shimizu | B62D 5/001 701/43 |

FOREIGN PATENT DOCUMENTS

JP 2004-299492 A 10/2004

\* cited by examiner

*Primary Examiner* — Kevin Hurley
(74) *Attorney, Agent, or Firm* — Troutman Sanders LLP

(57) ABSTRACT

An electric power steering apparatus includes steering mechanisms that direct left and right front wheels of a vehicle equipped with the electric power steering apparatus according to rotation of a steering shaft to which a steering wheel is coupled, a first motor and a second motor that give an assist torque to the steering mechanisms, and a controller that controls the assist torques generated by the first motor and the second motor. The controller causes the first motor to generate the torque in a direction of the steering operation when a generation of the assist torque is started. The controller causes the second motor to generate the torque after a rotation of the first motor is detected. The torque of the second motor is smaller than the torque of the first motor and opposite from the direction of the steering operation.

2 Claims, 2 Drawing Sheets

ELECTRIC POWER STEERING APPARATUS

CROSS-REFERENCE TO RELATED APPLICATION

The present application claims priority from Japanese Patent Application No. 2014-196458 filed on Sep. 26, 2014, the entire contents of which are hereby incorporated by reference.

BACKGROUND

1. Technical Field

The present disclosure relates to electric power steering apparatuses mounted on vehicles, such as automobiles, and particularly to an electric power steering apparatus with improved steering feels at an early stage of steering.

2. Related Art

The electric power steering apparatus detects torque of steering operation by a vehicle operator, and generates assist torque by an electric motor according to the detected torque. It is known that such electric power steering apparatus is provided with a torque amplifying mechanism that utilizes a set of a worm and a worm wheel (i.e., worm drive) in preparation for a case where a large assist torque is required, for example, when the operator performs a stationary steering (a steering operation when the vehicle is not traveling) or a sudden steering.

Such electric power steering apparatus may cause a point of inflection in the steering torque before and after the assist torque is generated by the electric motor, resulting in a nonlinear steering force and a deteriorated steering feel. That is, the operator senses a resistance when the steering torque passes through the point of inflection at the early stage of steering, and then senses a feel that the steering force is reduced in a stepped manner. Therefore, the operator finds the vehicle with a low quality of steering feels. Such a change in the steering torque may be caused by a reduction in a coefficient of friction at the engagement sections (sliding parts) of the worm drive when the assist torque is generated by the motor because the engagement sections transits from a static friction state to a dynamic friction state.

For example, Japanese Unexamined Patent Application Publication (JP-A) No. 2004-299492 discloses a conventional technology of the electric power steering apparatus for improving a steering feel at an early stage of steering. The electric power steering apparatus changes a steering force characteristics model for setting a target steering force between an early stage of steering transitional phase and other steering phases in order to obtain an ideal steering feel both at the early stage of steering transitional phase and other steering phases.

SUMMARY OF THE INVENTION

However, the transition of the worm drive from the static friction state to the dynamic friction state cannot be avoided at the early stage of steering also in the technology as disclosed in JP-A No. 2004-299492 that aims at the improvement of the steering feel by the control. Therefore, it is still difficult to eliminate the influences.

It is desirable to provide an electric power steering apparatus with an improved steering feel at an early stage of steering.

An aspect of the present disclosure provides an electric power steering apparatus that includes: a steering mechanism that directs left and right front wheels of a vehicle equipped with the electric power steering apparatus according to rotation of a steering shaft to which a steering wheel is coupled; a first motor and a second motor that give an assist torque to the steering mechanism according to a steering operation of the steering wheel; and a controller that controls torques generated by the first motor and the second motor. The controller causes the first motor to generate the torque in a direction of the steering operation when a generation of the assist torque is started. The controller causes the second motor to generate the torque after a rotation of the first motor is detected. The torque of the second motor is smaller than the torque of the first motor and opposite from the direction of the steering operation.

The torque generated by the second motor may be set substantially equal to a variation associated with a transition of friction torque from a static friction state to a dynamic friction state. The friction torque is generated in a transmission mechanism that transmits the torque of the first motor to the steering mechanism.

BRIEF DESCRIPTION OF THE DRAWINGS

The present disclosure is illustrated by way of example and not by way of limitation in the figures of the accompanying drawings, in which the like reference numerals indicate like elements and in which.

DETAILED DESCRIPTION OF THE INVENTION

The present disclosure achieves the purpose for providing the electric power steering apparatus with the improved steering feel at the early stage of steering by having two-motor configuration of a first motor and a second motor. The first motor generates torque, while the second motor generates, after a detection of rotation of the first motor, a torque in the opposite direction from the first motor, such that the torque of the second motor is smaller than the torque of the first motor.

EXAMPLE

Hereinafter, an electric power steering apparatus according to an example of the present disclosure will be described. The electric power steering apparatus is mounted, for example, on a four-wheeled automobile such as passenger car, and generates assist torque when a vehicle operator steers to direct front wheels.

Figure 1:
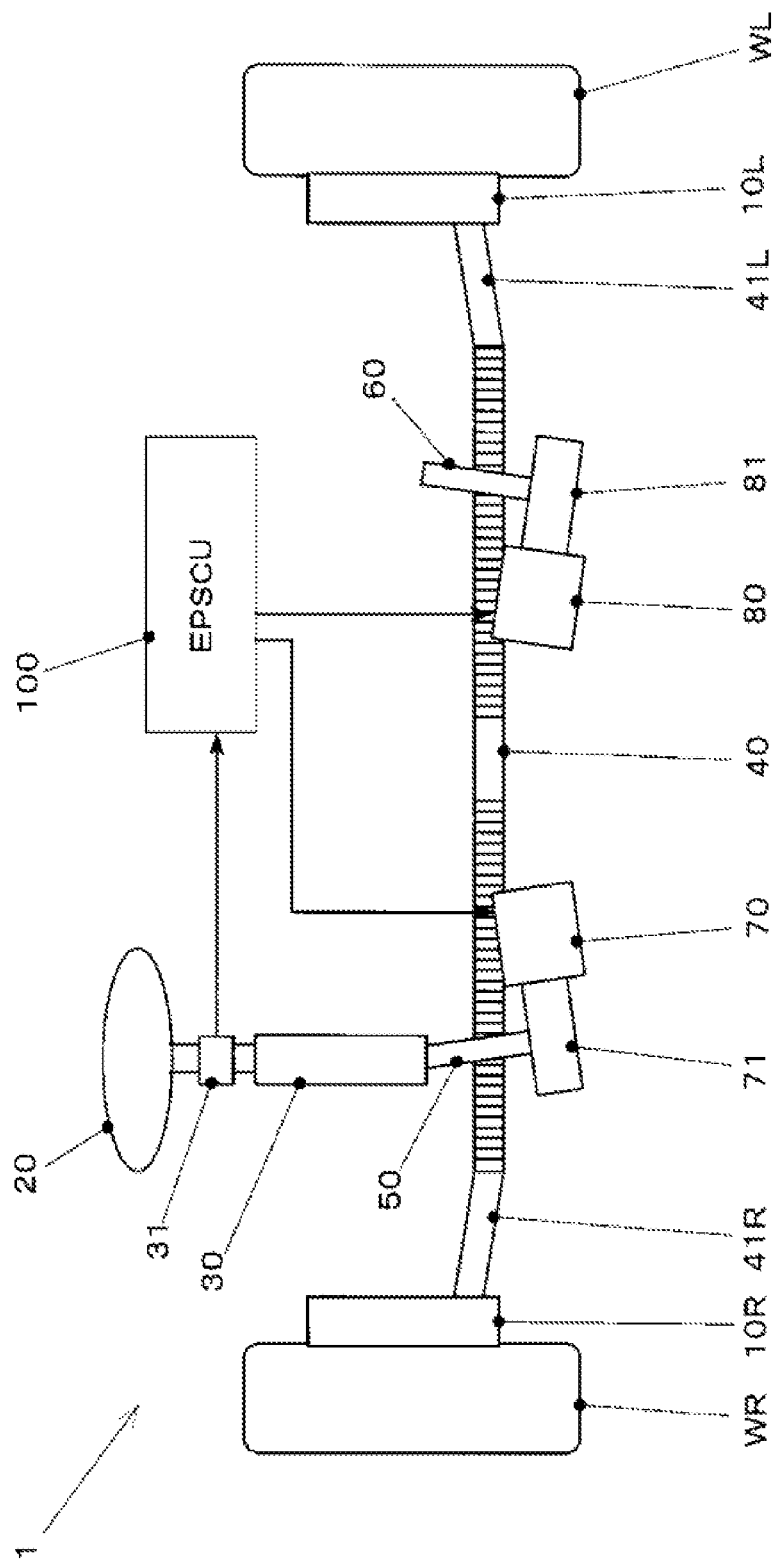
FIG. 1 illustrates a configuration of an electric power steering apparatus to which an example of the present disclosure is applied.

FIG. 1 illustrates a configuration of the electric power steering apparatus. The electric power steering apparatus 1 includes a rack-and-pinion steering mechanism in which a left housing 10L and a right housing 10R are rotated about predetermined steering axes (virtual kingpin axes). The left housing 10L and the right housing 10R support a left front wheel WL and a right front wheel WR so as to be rotatable about their axles, respectively. The left housing 10L and the right housing 10R are members that accommodate and hold respective hub bearings so as to be rotatable. Each hub bearing supports a hub where a corresponding one of the left and right front wheels is fixed.

The electric power steering apparatus 1 includes a steering wheel 20, a steering column 30, a rack 40, a first pinion shaft 50, a second pinion shaft 60, a first motor 70, a second motor 80, and an electric power steering apparatus control unit (EPSCU) 100.

The steering wheel 20 has an annular rim that is disposed so as to oppose to the operator, and is an input part to which a steering operation is inputted by the operator rotating to the right or the left about a center axis of the steering wheel 20. The steering column 30 is provided with a steering shaft that is a rotary shaft for transmitting a rotation of the steering wheel 20 to the first pinion shaft 50. A torque sensor 31 is provided to the steering column 30. The torque sensor 31 detects a steering torque inputted by the operator through the steering wheel 20 (or a reaction force that the operator receives from the steering wheel 20) by detecting a twist of a torsion bar disposed at an intermediate position of the steering shaft.

The rack 40 is formed by cutting rack teeth on a bar-shaped member that extends in vehicle width directions and is supported by a vehicle body (not illustrated) so as to be movable in the vehicle width directions. Left and right ends of the rack 40 are coupled to steering knuckle arm portions of the left housing 10L and the right housing 10R via left and right tie rods 41L and 41R, respectively. The rack 40 interlocks with the rotation of the steering wheel 20 and is relatively displaced rightward and leftward with respect to the vehicle body to push and pull the left and right tie rods 41L and 41R, thereby directing the left front wheel WL and the right front wheel WR.

The first pinion shaft 50 is a member of a rotary shaft shape provided at an end portion of the steering column 30 on the opposite side from the steering wheel 20. The first pinion shaft 50 has a pinion gear that meshes with the rack teeth of the rack 40, and the rack 40 is linearly moved in the vehicle width directions according to the rotation of the first pinion shaft 50. The first pinion shaft 50 is a member that transmits the rotation of the steering column 30 to the rack 40, and transmits torque of the first motor 70 to the rack 40.

The second pinion shaft 60 is a member of a rotary shaft shape provided at a position separated from the first pinion shaft 50 in the vehicle width direction. The second pinion shaft 60 has a pinion gear that meshes with the rack teeth of the rack 40. The second pinion shaft 60 is a member that transmits torque of the second motor 80 to the rack 40.

The first motor 70 and the second motor 80 are actuators that give the torques to the first pinion shaft 50 and the second pinion shaft 60 via transmission mechanisms 71 and 81, respectively. Electric motors, such as DC brushless motors, may be used as the first motor 70 and the second motor 80, for example.

The transmission mechanisms 71 and 81 respectively include worms coupled to output shafts of the first motor 70 and the second motor 80, worm wheels coupled to the first pinion shaft 50 and the second pinion shaft 60, and a housing that accommodates and supports these respective components so as to be rotatable. The transmission mechanisms 71 and 81 reduce speeds of the rotational outputs of the first motor 70 and the second motor 80 to amplify the torques of the rotational outputs, and transmit the amplified torques to the first pinion shaft 50 and the second pinion shaft 60, respectively. The first motor 70 and the transmission mechanism 71, and the second motor 80 and the transmission mechanism 81 are designed to have substantially similar output characteristics, reduction ratios, internal frictions, transmission efficiencies, etc.

The EPSCU 100 calculates target torques of the first motor 70 and the second motor 80 based on the output of the torque sensor 31, and then controls supplying power so that the generated torque of each motor is substantially in agreement with the corresponding target torque. Here, a sum (when generating the torques in the same direction) or a difference (when generating the torques in the opposite directions) of the torques generated by the first motor 70 and the second motor 80 serves as the assist torque that is given to the rack 40. The EPSCU 100 is capable of determining the rotating direction and the rotating speed of each motor.

Figure 2:
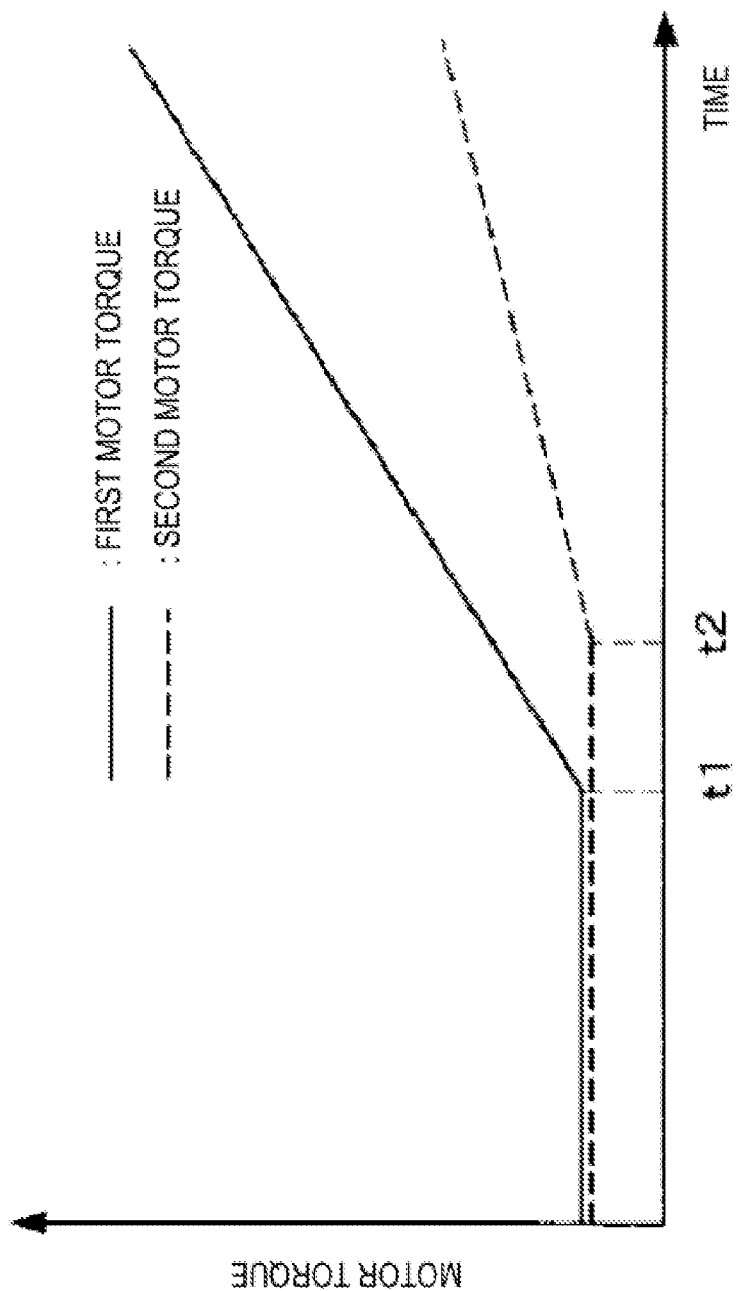
FIG. 2 is a graph exemplifying transition of motor torques of a first motor and a second motor at an early stage of steering of the electric power steering apparatus.

Next, operation of the electric power steering apparatus at an early stage of steering will be described. FIG. 2 is a graph exemplifying transition of the motor torques of the first motor 70 and the second motor 80 at an early stage of steering of the electric power steering apparatus. In FIG. 2, the horizontal axis indicates time and the vertical axis indicates the torques generated by the first motor 70 and the second motor 80. In FIG. 2, the torques of the first motor 70 and the second motor 80 are represented by a solid line and a dashed line, respectively.

The torques generated by the first motor 70 and the second motor 80 are controlled to be in mutually opposite directions. That is, for example, the first motor 70 may be configured to generate torque in a rightward steering direction and the second motor 80 may be configured to generate torque in a leftward steering direction, and vice versa.

FIG. 2 indicates a case where the vehicle travels straightforward, and then makes a right turn at a time t1. Before the time t1, the first motor 70 (e.g., rotates in the rightward steering direction) and the second motor 80 (e.g., rotates in the leftward steering direction) generate comparatively small and substantially equal torques in the mutually opposite directions so that these torques are balanced to keep a traveling-straight state of the vehicle. At the time t1, when the torque sensor 31 detects a torque due to a rightward steering operation, the EPSCU 100 first sets an output torque instruction value of the first motor 70 so that only the torque of the first motor 70 increases. Thus, the balance of torques between the first motor 70 and the second motor 80 collapses, and an assist torque (a difference of torques between the first motor 70 and the second motor 80) to the right is generated.

Then, at a time t2, when the EPSCU 100 determines (detects) a start of rotation of the first motor 70, the EPSCU 100 increases the torque of the second motor 80 on the opposite side from the torque of the first motor 70 to reduce an influence of the sliding parts, such as the worm drive in the transmission mechanism 71 of the first motor 70, the sliding parts shifting from a static friction state to a dynamic friction state. Here, the torque generated by the second motor 80 is set substantially equivalent to a variation of a friction torque of the transmission mechanism 71 of the first motor 70 (i.e., a torque required for the first motor 70 rotating only the transmission mechanism 71 alone) when transiting from the static friction state to the dynamic friction state.

On the other hand, in the case of left turn, the torque of the second motor 80 is first increased, and the torque of the first motor 70 is increased after the detection of the rotation of the second motor 80.

When a malfunction of either one of the first motor 70 and the second motor 80 is detected, the EPSCU 100 uses only the other motor which is normal to perform a similar control to the existing control for an electric power steering apparatus with a single motor in which a leftward or rightward assist torque is generated by the single motor.

As described above, according to this example, when the first motor 70 starts rotating and the friction inside the transmission mechanism 71 such as the worm drive transits from the static friction state to the dynamic friction state to be reduced, the second motor 80 generates the torque in such a direction to cancel the torque variation due to the friction of the transmission mechanism 71 of the first motor 70. Thus, the point of inflection being caused in the steering torque can be reduced, and the sense of resistance or the feel that the steering force is reduced in a stepped manner can be prevented. Therefore, the steering feel at an early stage of steering can be improved.

Modifications

The present disclosure is not intended to be limited to the example described above, and various modifications and changes may be made to the disclosure, and the modifications and changes still fall under the technical scope of the disclosure. Therefore, the particular configuration of the electric power steering apparatus should not be limited to the example described above and can be suitably changed. For example, the electric power steering apparatus of the example is a rack-assist type which directly transmits the assist force to the rack. Alternatively, another type such as, but not limited to, a pinion-assist type and a column-assist type that transmit an assist force to a pinion shaft and a steering column, respectively, may also be applicable.

The invention claimed is:

1. An electric power steering apparatus, comprising:
   a steering mechanism that directs left and right front wheels of a vehicle equipped with the electric power steering apparatus according to rotation of a steering shaft to which a steering wheel is coupled;
   a first motor and a second motor that give an assist torque to the steering mechanism according to a steering operation of the steering wheel; and
   a controller that controls torques generated by the first motor and the second motor,
   wherein the controller causes the first motor to generate the torque in a direction of the steering operation when a generation of the assist torque is started, and
   wherein the controller causes the second motor to generate the torque after a rotation of the first motor is detected, the torque of the second motor being smaller than the torque of the first motor and opposite from the direction of the steering operation.

2. The electric power steering apparatus of claim 1, wherein the torque generated by the second motor is set substantially equal to a variation associated with a transition of friction torque from a static friction state to a dynamic friction state, the friction torque being generated in a transmission mechanism that transmits the torque of the first motor to the steering mechanism.

* * * * *